United States Patent
Sugiura

(10) Patent No.: US 11,939,943 B2
(45) Date of Patent: Mar. 26, 2024

(54) IGNITION APPARATUS FOR INTERNAL COMBUSTION ENGINE

(71) Applicant: DENSO CORPORATION, Kariya (JP)

(72) Inventor: Akimitsu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/110,539

(22) Filed: Feb. 16, 2023

(65) Prior Publication Data

US 2023/0193870 A1     Jun. 22, 2023

Related U.S. Application Data

(63) Continuation of application No. PCT/JP2021/026588, filed on Jul. 15, 2021.

(30) Foreign Application Priority Data

Aug. 21, 2020 (JP) ................................. 2020-140349

(51) Int. Cl.
*F02P 13/00*     (2006.01)
*F02B 19/12*     (2006.01)
*F02P 15/10*     (2006.01)

(52) U.S. Cl.
CPC .............. *F02P 13/00* (2013.01); *F02B 19/12* (2013.01); *F02P 15/10* (2013.01)

(58) Field of Classification Search
CPC ............ F02P 13/00; F02B 19/12; F01P 15/10
USPC ......................................................... 123/266
See application file for complete search history.

(56) References Cited

U.S. PATENT DOCUMENTS

2018/0038338 A1    2/2018   Sugiura et al.

FOREIGN PATENT DOCUMENTS

| DE | 102015205014 A1 * | 4/2016 | .......... F01L 13/0005 |
| DE | 102018128712 A1 * | 5/2019 | .............. F02B 19/08 |
| DE | 10 2017 221 517 | 6/2019 | |
| JP | 2017-103179 | 6/2017 | |
| JP | 2019-190362 | 10/2019 | |
| JP | 2019190362 A * | 10/2019 | |
| JP | 2020-009747 | 1/2020 | |
| JP | 2020-159355 | 10/2020 | |

OTHER PUBLICATIONS

JP-2019190362-A (Shun et al.) (Oct. 31, 2019) (Machine Translation) (Year: 2019).*
DE-102018128712-A1 (James, Cress) (May 23, 2019) (Machine Translation) (Year: 2019).*
DE-102015205014-A1 (Yuhei et al.) (Apr. 21, 2016) (Machine Translation) (Year: 2016).*

\* cited by examiner

*Primary Examiner* — Mahmoud Gimie
(74) *Attorney, Agent, or Firm* — Nixon & Vanderhye P.C.

(57) ABSTRACT

Disclosed is an ignition apparatus for an internal combustion engine. The ignition apparatus includes a spark plug, an ignition coil and a controller. The spark plug has an auxiliary combustion chamber in which a discharge gap is arranged. The ignition coil is configured to apply a voltage to the spark plug. The controller is configured to perform a multiple-discharge mode in which discharge is generated at least twice, with a discharge pause period intervening therebetween, across the discharge gap within a period from a compression stroke to an expansion stroke of the internal combustion engine.

9 Claims, 9 Drawing Sheets

IGNITION APPARATUS FOR INTERNAL COMBUSTION ENGINE

CROSS-REFERENCE TO RELATED APPLICATIONS

The present application is a continuation application of International Application No. PCT/JP2021/026588 filed on Jul. 15, 2021, which is based on and claims priority from Japanese Patent Application No. 2020-140349 filed on Aug. 21, 2020. The entire contents of these applications are incorporated by reference into the present application.

BACKGROUND

1 Technical Field

The present disclosure relates to ignition apparatuses for internal combustion engines.

2 Description of Related Art

There is known, for example from German Patent Application Publication No. DE102017221517A1, a spark plug that has an auxiliary combustion chamber. In the spark plug, an air-fuel mixture in the auxiliary combustion chamber is ignited by discharge generated across a discharge gap formed within the auxiliary combustion chamber. Then, the flame formed in the auxiliary combustion chamber is ejected as a flame jet into a main combustion chamber of an internal combustion engine through orifices formed in a cover (or cap) of the spark plug. Consequently, combustion in the main combustion chamber of the internal combustion engine can be promoted.

SUMMARY

However, in the known spark plug that has the auxiliary combustion chamber, there is still room for improvement in terms of the ignition performance in the auxiliary combustion chamber. Accordingly, in an ignition apparatus for an internal combustion engine which includes the known spark plug, there is room for enhancing the flame jet ejected from the auxiliary combustion chamber into the main combustion chamber and thereby improving the combustion efficiency in the main combustion chamber.

The present disclosure has been accomplished in view of the above circumstances.

According to the present disclosure, there is provided an ignition apparatus for an internal combustion engine. The ignition apparatus includes a spark plug, an ignition coil and a controller. The spark plug has an auxiliary combustion chamber in which a discharge gap is arranged. The ignition coil is configured to apply a voltage to the spark plug. The controller is configured to perform a multiple-discharge mode in which discharge is generated at least twice, with a discharge pause period intervening therebetween, across the discharge gap within a period from a compression stroke to an expansion stroke of the internal combustion engine.

With the above configuration, the controller performs the multiple-discharge mode in which discharge is generated at least twice, with a discharge pause period intervening therebetween, across the discharge gap within a period from a compression stroke to an expansion stroke of the internal combustion engine. Consequently, in the multiple-discharge mode, a plurality of initial flames can be generated in the auxiliary combustion chamber by the discharge generated a plurality of times (i.e., at least twice). Further, the plurality of initial flames can be integrated together in the auxiliary combustion chamber, thereby improving the ignition performance in the auxiliary combustion chamber. As a result, it becomes possible to enhance the flame jet from the auxiliary combustion chamber into a main combustion chamber of the internal combustion engine, thereby improving the combustion efficiency in the main combustion chamber.

DESCRIPTION OF EMBODIMENTS

Figure 1:
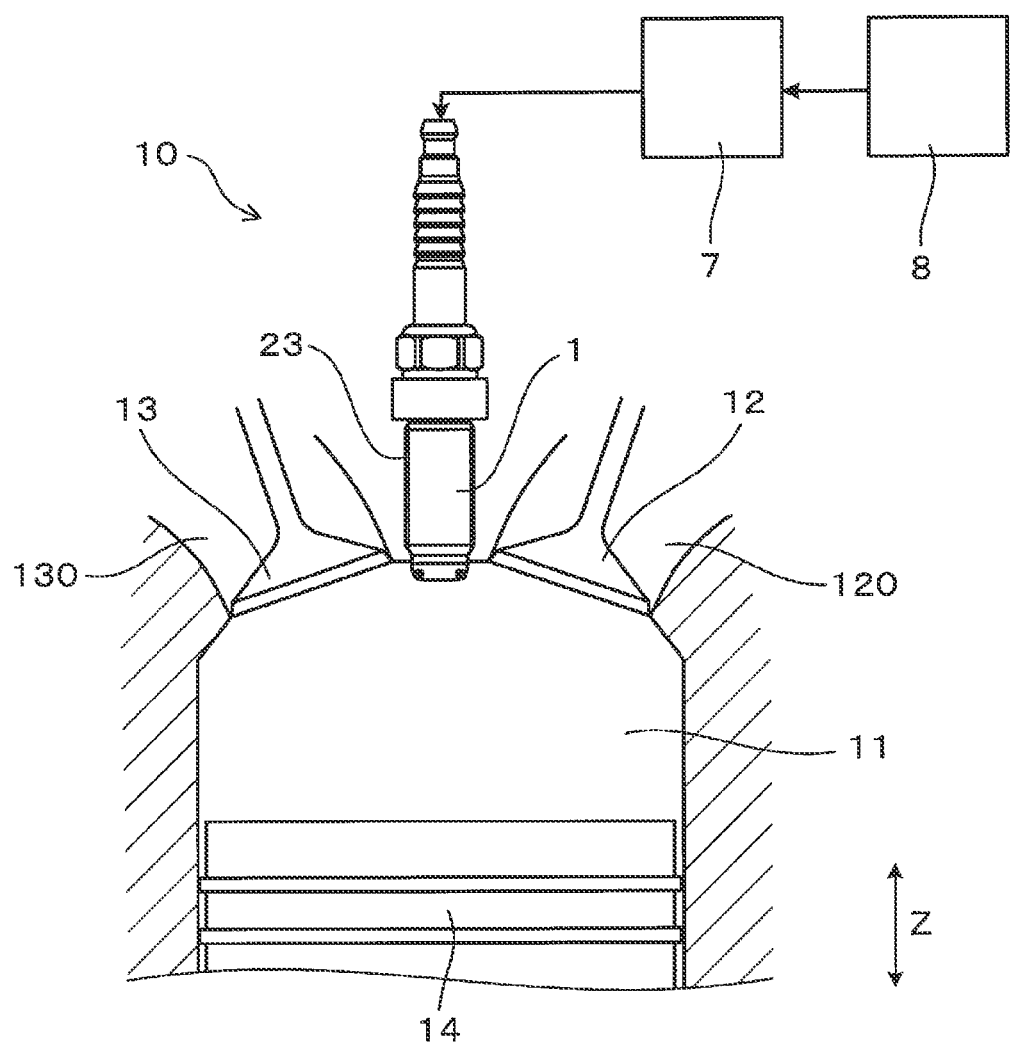
FIG. 1 is a schematic diagram illustrating an ignition apparatus for an internal combustion engine according to a first embodiment.

Exemplary embodiments will be described hereinafter with reference to the drawings. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

An ignition apparatus 10 for an internal combustion engine according to the first embodiment will be described with reference to FIGS. 1-6.

As shown in FIG. 1, the ignition apparatus 10 according to the present embodiment includes a spark plug 1, an ignition coil 7 and a controller (or control unit) 8.

Figure 2:
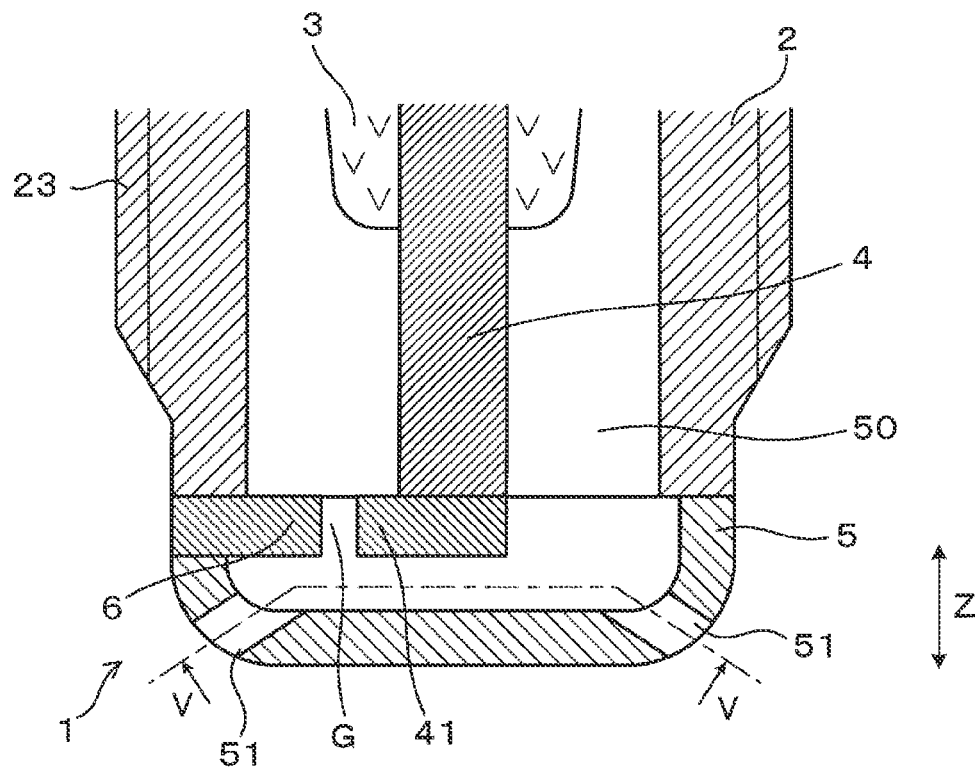
FIG. 2 is a cross-sectional view of a distal end part of a spark plug of the ignition apparatus according to the first embodiment.

As shown in FIG. 2, the spark plug 1 has an auxiliary combustion chamber 50 in which a discharge gap G is arranged. The ignition coil 7 applies a high voltage to the spark plug 1. The controller 8 controls discharge in the spark plug 1.

Figure 3:
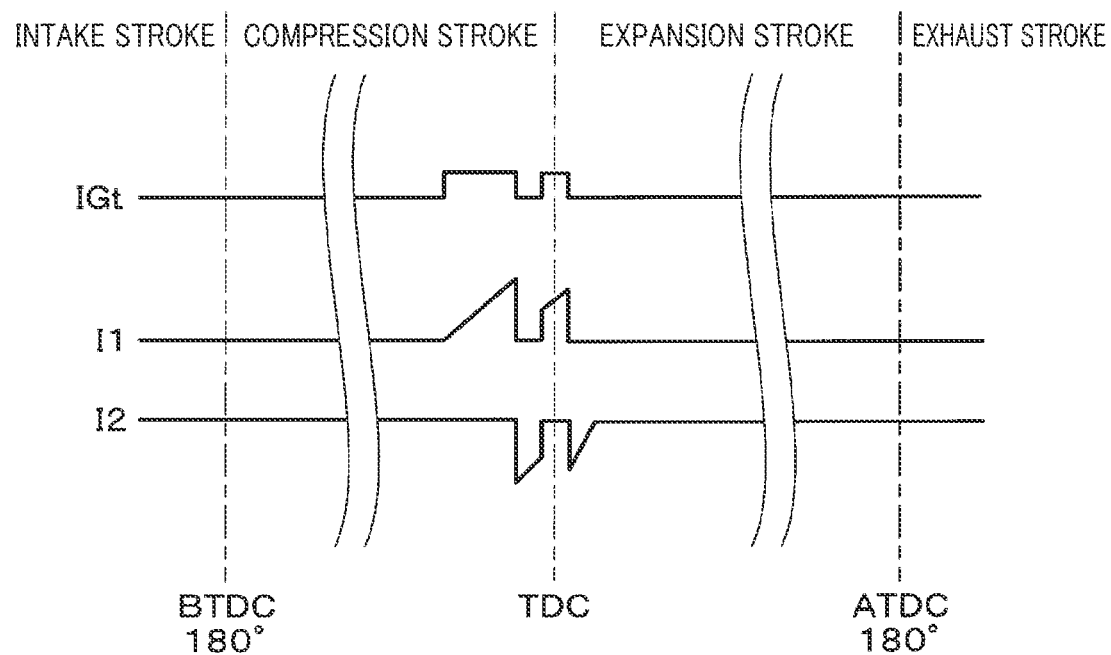
FIG. 3 is a timing chart illustrating an ignition signal, primary current and secondary current in the ignition apparatus according to the first embodiment.
Figure 4:
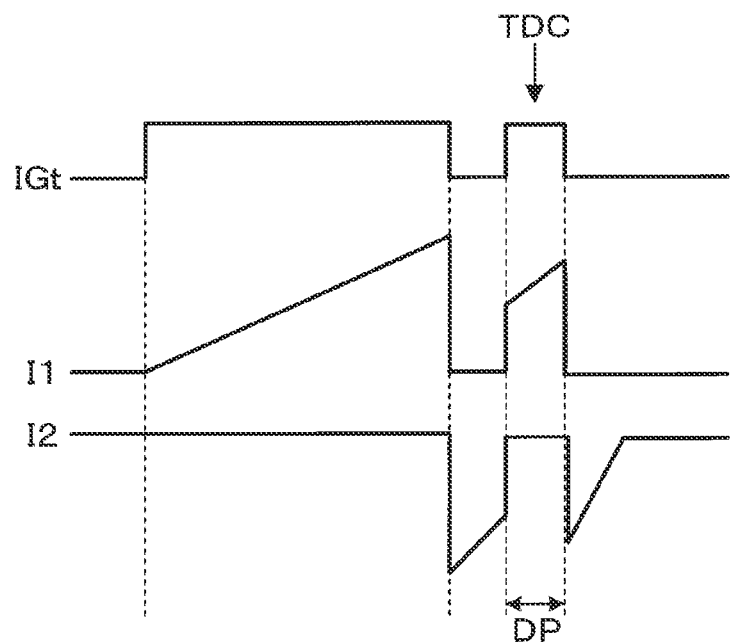
FIG. 4 is a timing chart illustrating the ignition signal, the primary current and the secondary current near a TDC (Top Dead Center) in the ignition apparatus according to the first embodiment.

Specifically, in the present embodiment, as shown in FIGS. 3 and 4, the controller 8 is configured to perform a multiple-discharge mode in which discharge is generated at least twice (i.e., a plurality of times), with a discharge pause period DP intervening therebetween, across the discharge gap G within a period from a compression stroke to an expansion stroke of the internal combustion engine.

The controller 8 may be implemented by, for example, a vehicular ECU (Electronic Control Unit). The controller 8 transmits an ignition signal IGt to the ignition coil 7 at predetermined timings. Based on the ignition signal IGt, the ignition coil 7 applies the high voltage to the spark plug 1, thereby causing discharge to be generated across the discharge gap G in the spark plug 1.

In addition, the ignition apparatus 10 according to the present embodiment can be used, for example, as ignition means in internal combustion engines of motor vehicles, cogeneration systems and the like.

As shown in FIG. 1, one end of the spark plug 1 in an axial direction Z thereof is located in a main combustion chamber 11 of the internal combustion engine. Hereinafter, in the axial direction Z of the spark plug 1, that side which is exposed to the main combustion chamber 11 will be referred to as the distal side; and the opposite side to the distal side will be referred to as the proximal side.

As shown in FIG. 2, the spark plug 1 includes a tubular insulator 3, a center electrode 4, a tubular housing 2, a ground electrode 6 and a cover 5. The center electrode 4 is held in the insulator 3 such that a distal end part of the center electrode 4 protrudes distalward from the insulator 3. In the present embodiment, the distal end part of the center electrode 4 includes a radially-protruding portion 41 that protrudes radially outward from the remainder of the distal end part. The discharge gap G is formed between the radially-protruding portion 41 of the center electrode 4 and the ground electrode 6. The housing 2 holds the insulator 3 therein. Moreover, the housing 2 has a threaded portion 23 for mounting the spark plug 1 to the internal combustion engine. The cover 5 is provided at a distal end of the housing 2. In the cover 5, there are formed a plurality of orifices (or through-holes) 51.

Figure 5:
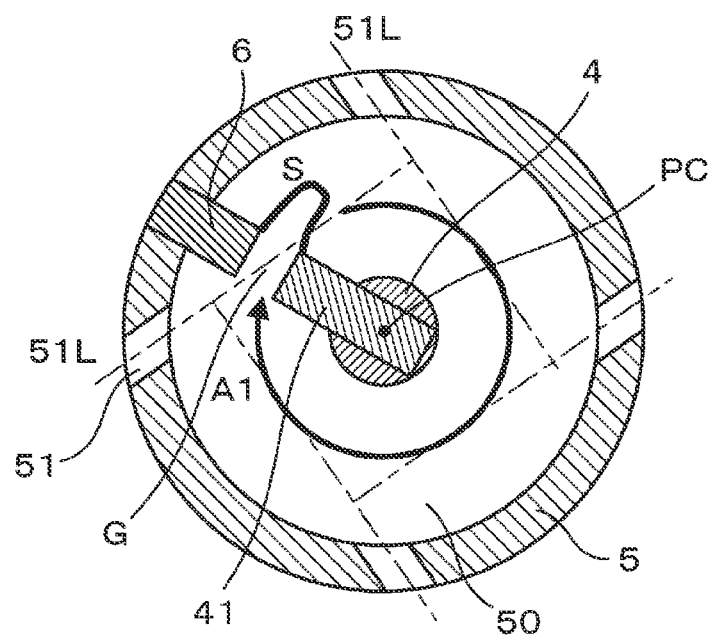
FIG. 5 is a cross-sectional view, taken along the line V-V in FIG. 2, illustrating swirl flow generated in an auxiliary combustion chamber of the spark plug in a compression stroke of the internal combustion engine.

In the present embodiment, the orifices 51 are formed so that swirl flow can be generated, as indicted by an arrow A1 in FIG. 5, in the auxiliary combustion chamber 50 by the gas flow (i.e., the flow of air-fuel mixture) introduced from the main combustion chamber 11 of the internal combustion engine into the auxiliary combustion chamber 50 through the orifices 51. Specifically, as shown in FIG. 5, the orifices 51 are formed so that when the spark plug 1 is viewed along the axial direction Z, axes 51L of the orifices 51 do not pass through a central axis PC of the spark plug 1. More particularly, in the present embodiment, the axes 51L of the orifices 51 do not pass through the center electrode 4.

As shown in FIG. 2, the ground electrode 6 is arranged to face a distal end of the radially-protruding portion 41 of the center electrode 4 from the outer peripheral side (i.e., from the radially outer side). More particularly, in the present embodiment, the ground electrode 6 protrudes in a radial direction of the spark plug 1 toward the center electrode 4 from the junction between the distal end of the housing 2 and a proximal end of the cover 5. Moreover, the distal gap G is located distalward from the distal end of the housing 2.

The internal combustion engine is a so-called four-stroke engine. Specifically, as shown in FIG. 1, the reciprocating movement of a piston 14 and the opening/closing of an intake valve 12 and an exhaust valve 13 are performed so as to sequentially repeat an intake stroke, a compression stroke, an expansion stroke and an exhaust stroke in the main combustion chamber 11 of the internal combustion engine. In addition, in FIG. 1, the reference numeral 120 designates an intake port; and the reference numeral 130 designates an exhaust port.

As shown in FIGS. 3 and 4, the ignition apparatus 10 causes the spark plug 1 to generate discharge a plurality of times at predetermined crank angles of the piston 14. Specifically, the controller 8 transmits the ignition signal IGt to the ignition coil 7 at predetermined timings with respect to the crank angle of the piston 14, thereby causing the ignition coil 7 to apply the high voltage to the spark plug 1.

Although not shown in the drawings, the ignition coil 7 includes a primary coil and a secondary coil that are magnetically coupled with each other. The primary coil is connected with a DC power supply. In operation, the primary coil is supplied with primary current from the DC power supply based on the ignition signal IGt from the controller 8. Further, in response to interruption of the primary current flowing to the primary coil, a secondary voltage is generated in the secondary coil by an induced electromotive force. The secondary voltage is applied to the spark plug 1, thereby causing discharge to be generated across the discharge gap G.

FIG. 3 is a timing chart illustrating an example of timings of the ignition signal IGt, the primary current I1 and the secondary current I2 with respect to the crank angle in the multiple-discharge mode. In FIG. 3, "TDC" represents the compression top dead center; "BTDC180°" represents the crank angle 180° before the compression top dead center; and "ATDC180°" represents the crank angle 180° after the compression top dead center. Hereinafter, the compression top dead center will be simply referred to as the TDC as appropriate.

More particularly, in the present embodiment, depending on the operating state of the internal combustion engine, discharge is generated near the TDC. For example, during a high-load operation of the internal combustion engine or during the transition from a fast catalyst warm-up operation to an idle operation of the internal combustion engine, the air-fuel mixture is generally ignited near the TDC. Specifically, discharge may be generated, for example, during a period of BTDC10°-ATDC10°, more preferably during a period of BTDC5®-ATDC7°.

The inventor of the present application has found that the ignition performance of the spark plug 1 with the auxiliary combustion chamber 50 is particularly lowered when discharge is generated near the TDC. Specifically, the gas (i.e., the air-fuel mixture) flows into the auxiliary combustion chamber 50 from the main combustion chamber 11 through the orifices 51; and the gas flows out of the auxiliary combustion chamber 50 into the main combustion chamber 11 through the orifices 51. Therefore, as shown in FIGS. 5 and 6, gas flow A1 or A2 is generated in the auxiliary combustion chamber 50. When the discharge S generated across the discharge gap G is extended by the gas flow, the ignition performance in the auxiliary combustion chamber 50 is enhanced. However, the speed of the gas flow in the auxiliary combustion chamber 50 tends to be lowered near the TDC that is the boundary between the compression stroke and the expansion stroke. That is, near the TDC, it is close to the timing of switching between the gas flow into the auxiliary combustion chamber 50 and the gas flow out of the auxiliary combustion chamber 50; thus, the gas flow in the auxiliary combustion chamber 50 is weakened and/or becomes turbulent, causing the speed of the gas flow to be temporarily lowered. Consequently, at such timing, it becomes difficult for the discharge S generated across the discharge gap G to be extended by the gas flow; thus, the ignition performance in the auxiliary combustion chamber 50 may be lowered.

In view of the above, in the present embodiment, the multiple-discharge mode is performed, near the TDC, to cause discharge to be generated a plurality of times across the discharge gap G, thereby improving the ignition performance in the auxiliary combustion chamber 50. Specifically, as shown in FIG. 4, the controller 8 causes discharge to be generated at least twice (i.e., a plurality of times), with the discharge pause period DP intervening therebetween, across the discharge gap G of the spark plug 1. Moreover, in the multiple-discharge mode, the controller 8 causes discharge to be generated at least once in the expansion stroke.

In addition, the generation of the secondary current I2 shown in FIGS. 3 and 4 represents the generation of discharge across the discharge gap G of the spark plug 1. More specifically, the downward-protruding portions of the line representing the secondary current I2 in FIGS. 3 and 4 designate the generation of discharge across the discharge gap G of the spark plug 1.

It should be noted that the "discharge pause period DP" denotes a period which is between any two of a plurality of discharges intermittently generated in one cycle and during which no discharge is generated. Therefore, a period before the first discharge among the plurality of discharges intermittently generated in one cycle is not the "discharge pause period DP"; and a period after the last discharge among the plurality of discharges is also not the "discharge pause period DP".

More particularly, in the present embodiment, as shown in FIG. 4, discharge is generated twice with the discharge pause period DP intervening therebetween. Moreover, the two discharges are generated across the TDC. That is, the start time of the first discharge is before the TDC; and the end time of the second discharge is after the TDC. Furthermore, the discharge pause period DP between the two discharges is set to a period across the TDC. In addition, the two discharges may be generated during a period of BTDC10°-ATDC10°, more preferably during a period of BTDC5°-ATDC7°.

More specifically, in the multiple-discharge mode according to the present embodiment, the first discharge is generated immediately before the TDC (e.g., during a period of BTDC5°-BTDC1°). Then, the discharge pause period DP is provided between a time instant immediately before the TDC and a time instant immediately after the TDC. Thereafter, the second discharge is generated immediately after the TDC (e.g., during a period of ATDC3°-ATDC7°).

To realize the above multiple-discharge mode, the controller 8 first applies the ignition signal IGt to the ignition coil 7 (more specifically, to an igniter of the ignition coil 7) for a predetermined period before the TDC. Consequently, the primary current I1 is supplied to the primary coil of the ignition coil 7, thereby charging the ignition coil 7. During the charging of the ignition coil 7, the primary current I1 gradually increases. Then, at a time instant (e.g., BTDC5°) before the TDC, the ignition signal IGt is turned off to interrupt the primary current I1. As a result, the first discharge is generated across the discharge gap G; and the secondary current I2 flows as discharge current through the second coil of the ignition coil 7.

Thereafter, at a time instant (e.g., BTDC1°) immediately before the TDC, the ignition signal IGt is turned on again to start supplying the primary current I1 to the primary coil of the ignition coil 7. Consequently, the first discharge is stopped and the discharge pause period DP starts. Then, at a time instant (e.g., ATDC3°) immediately after the TDC, the ignition signal IGt is turned off again to interrupt the primary current I1. As a result, the second discharge is generated across the discharge gap G; and the secondary current I2 flows again as the discharge current through the second coil of the ignition coil 7. That is, the second discharge is generated immediately after the TDC.

As above, in the multiple-discharge mode according to the present embodiment, the first discharge and the second discharge are generated respectively before and after the TDC; and the discharge pause period DP between the two discharges exists across the TDC. Moreover, the discharge pause period DP (i.e., the second ON period of the ignition signal IGt) is shorter than the first charging period of the ignition coil 7 (i.e., the first ON period of the ignition signal IGt). Furthermore, the discharge pause period DP may be set to, for example, a length corresponding to 3°-6° in terms of the advancing of the crank angle.

Near the TDC, as described above, the speed of the gas flow in the auxiliary combustion chamber 50 is lowered; thus, the speed of the gas flow in the discharge gap G (hereinafter, will be simply referred to the "gap flow speed vg" as appropriate) is also lowered. As above, in the present embodiment, the timing at which the gap flow speed vg is lowered is within the discharge pause period DP. That is, the gap flow speed vg is lowered during the discharge pause period DP; and both the gap flow speed vg during the first discharge period and the gap flow speed vg during the second discharge period are higher than the gap flow speed vg during the discharge pause period DP.

In other words, the gap flow speed vg during the at least one discharge pause period DP is lower than both the gap flow speed vg during the discharge period immediately before the discharge pause period DP and the gap flow speed vg during the discharge period immediately after the discharge pause period DP. It should be noted that in the case where the gap flow speed vg changes during each period, the average speed for the period is used for the above comparison.

In addition, the controller 8 does not necessarily perform the multiple-discharge mode in all cycles, but performs or does not perform the multiple-discharge mode depending on the operating state of the internal combustion engine. For example, the controller 8 may be configured to perform the multiple-discharge mode only when ignition is performed near the TDC, such as during a high-load operation of the internal combustion engine or during the transition from a fast catalyst warm-up operation to an idle operation of the internal combustion engine.

According to the present embodiment, it is possible to achieve the following advantageous effects.

In the present embodiment, the ignition apparatus 10 for an internal combustion engine includes the spark plug 1, the ignition coil 7 and the controller 8. The spark plug 1 has the auxiliary combustion chamber 50 in which the discharge gap G is arranged. The ignition coil 7 is configured to apply a high voltage to the spark plug 1. The controller 8 is configured to perform the multiple-discharge mode in which discharge is generated at least twice, with the discharge pause period DP intervening therebetween, across the discharge gap G within a period from the compression stroke to the expansion stroke of the internal combustion engine. Consequently, in the multiple-discharge mode, a plurality of initial flames can be generated in the auxiliary combustion chamber 50 by the discharge generated a plurality of times (i.e., at least twice). Further, the plurality of initial flames can be integrated together in the auxiliary combustion chamber 50, thereby improving the ignition performance in the auxiliary combustion chamber 50. As a result, it becomes possible to enhance the flame jet ejected from the auxiliary combustion chamber 50 into the main combustion chamber 11 of the internal combustion engine, thereby improving the combustion efficiency in the main combustion chamber 11.

Moreover, in the present embodiment, in the multiple-discharge mode, the controller 8 causes the discharge to be generated at least once in the expansion stroke. Consequently, it becomes easier for the discharge to be extended by the gas flow generated in the expansion stroke. As a result, the ignition performance can be further improved.

In the present embodiment, the gap flow speed vg is lower during the discharge pause period DP than during the discharge periods immediately before and immediately after the discharge pause period DP. Consequently, it becomes easier for the discharge generated before and after the discharge pause period DP to be extended by the gas flow. Moreover, with the discharge pause period DP set to a period during which the gap flow speed vg is lower, discharge energy can be stored and left for the expansion stroke in which it is easier for the discharge to be extended by the gas flow.

Figure 6:
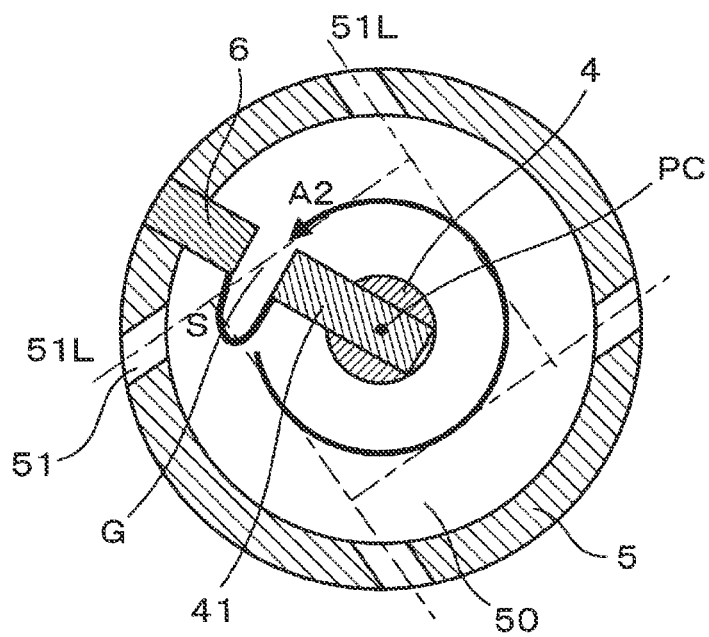
FIG. 6 is a cross-sectional view, taken along the line V-V in FIG. 2, illustrating swirl flow generated in the auxiliary combustion chamber of the spark plug in an expansion stroke of the internal combustion engine.

Specifically, in the compression stroke, swirl flow A1 is generated in the auxiliary combustion chamber 50 as shown in FIG. 5. The direction of the swirl flow A1 generated in the compression stroke is clockwise in the FIG. 5. Further, in the expansion stroke, swirl flow A2 is generated in the auxiliary combustion chamber 50 as shown in FIG. 6. However, the direction of the swirl flow A2 generated in the expansion stroke is counterclockwise in FIG. 6, and opposite to the direction of the swirl flow A1 generated in the compression stroke. At the time of switching from the compression stroke to the expansion stroke, i.e., near the TDC, the swirl flow generated in the auxiliary combustion chamber 50 is weakened.

In the auxiliary combustion chamber 50, the timings at which the speed of the swirl flow is lowered slightly differ between positions close to the orifices 51 and positions far from the orifices 51. Specifically, at positions close to the orifices 51, the timings at which the speed of the swirl flow is lowered substantially coincide with the TDC. On the other hand, at positions far from the orifices 51, the timings at which the speed of the swirl flow is lowered are slightly retarded from the TDC (see the fourth embodiment to be described later). In the present embodiment, since the discharge gap G is located relatively close to the orifices 51, the timing at which the gap flow speed vg is lowered substantially coincides with the TDC.

In the present embodiment, the first discharge and the second discharge are generated according to the change in the gap flow speed vg as described above. Specifically, the first discharge is generated in the compression stroke immediately before the TDC and during a period where the gap flow speed vg is maintained. On the other hand, the second discharge is generated in the expansion stroke and after the gap flow speed vg starts increasing. Consequently, both the first discharge and the second discharge can be easily extended, thereby improving the ignition performance. As a result, it becomes possible to enhance the flame jet ejected from the auxiliary combustion chamber 50 into the main combustion chamber 11 of the internal combustion engine, thereby improving the combustion efficiency in the main combustion chamber 11.

To sum up, according to the present embodiment, it becomes possible to provide the ignition apparatus 10 capable of improving the combustion efficiency.

Second Embodiment

Figure 7:
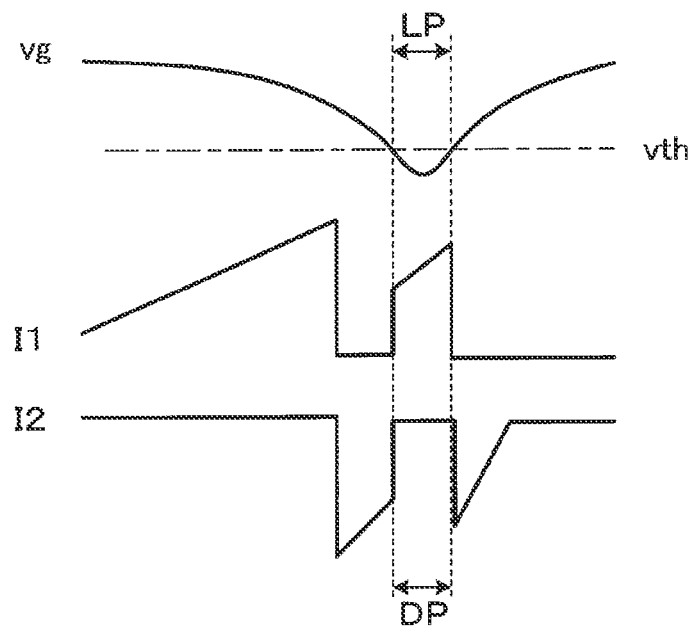
FIG. 7 is a timing chart illustrating the speed of gas flow in a discharge gap of a spark plug, primary current and secondary current in an ignition apparatus according to a second embodiment.

In the second embodiment, as shown in FIG. 7, the discharge pause period DP is set to a low flow speed period which is after the TDC and during which the gap flow speed vg is lower than a predetermined flow speed threshold vth.

That is, the discharge pause period DP coincides with the low flow speed period LP that is a period during which the gap flow speed vg is lower than the flow speed threshold vth. The flow speed threshold vth may be set to, for example, 5 m/sec. In this case, a period near the TDC, during which the gap flow speed vg is lower than 5 m/sec, could be defined as the low flow speed period LP.

In the present embodiment, the controller 8 has the discharge pause period DP stored therein as a specific period. More particularly, in the present embodiment, the change with time of the gap flow speed vg (i.e., the change of the gap flow speed vg with respect to the crank angle) is measured or estimated during the engine performance matching at the engine design and prototype stage. Then, the low flow speed period LP, during which the gap flow speed vg is lower than the flow speed threshold vth, is derived from the measured or estimated change with time of the gap flow speed vg. Thereafter, the low flow speed period LP is stored, as the discharge pause period DP, in the controller 8. That is, a period of specific timing is stored in advance in the controller 8 as the discharge pause period DP.

The gap flow speed vg may be directly measured by, for example, a hot-wire anemometer or the like. Otherwise, the gap flow speed vg may be estimated by a numerical analysis such as CFD (Computational Fluid Dynamics). In addition, in the case of the gap flow speed vg being directly measured, the measured value may slightly vary per cycle. Therefore, in this case, a period during which a minimum measured value is lower than the flow speed threshold vth is defined as the low flow speed period LP (i.e., as the discharge pause period DP); the minimum measured value is the minimum one of the measured values for a plurality of cycles.

In the present embodiment, the controller 8 controls the ignition signal IGt so as to realize the discharge pause period DP stored therein as described above. The others are the same as those in the first embodiment.

According to the present embodiment, it is also possible to achieve the same advantageous effects as described in the first embodiment.

Moreover, in the present embodiment, with the discharge pause period DP set to the low flow speed period LP, it becomes possible to prevent discharge from being generated at timing when it is difficult for the discharge to be extended by the gas flow. Consequently, it becomes possible to refrain from inputting discharge energy during a disadvantageous period to the ignition performance and to input discharge energy during other periods than the disadvantageous period. Accordingly, it becomes possible to improve the ignition performance in the auxiliary combustion chamber 50, thereby improving the combustion efficiency. In addition, since the controller 8 has the discharge pause period DP stored therein as a specific period, it becomes possible for the controller 8 to easily and reliably perform the ignition control.

Third Embodiment

In the present embodiment, as shown in FIGS. 8 to 11, the discharge pause period DP is set to start when the discharge sustaining voltage V2 or the attenuation rate $\Delta I2/\Delta t$ of the discharge current I2 (i.e., the secondary current I2) in the discharge generated immediately before the discharge pause period DP becomes lower than a predetermined threshold.

First, a method of determining the start of the discharge pause period DP using the discharge sustaining voltage V2 will be described.

Figure 8:
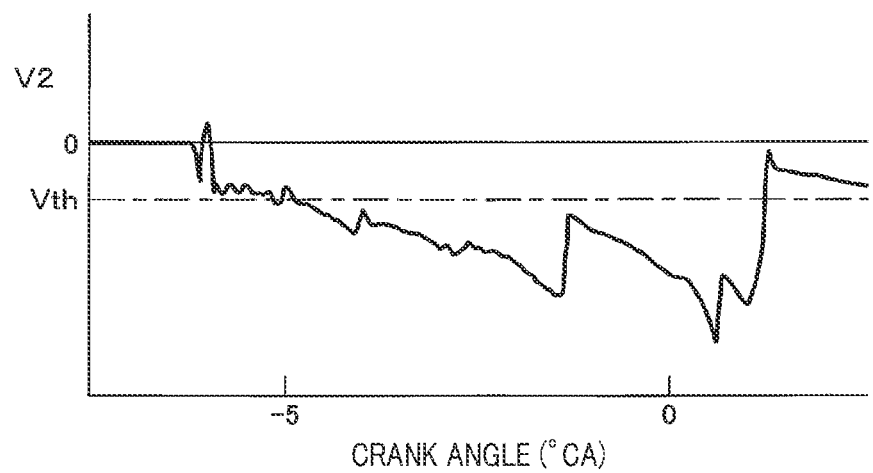
FIG. 8 is a timing chart illustrating a discharge sustaining voltage in an ignition apparatus according to a third embodiment.

As shown in FIG. 8, the discharge sustaining voltage V2 varies successively immediately after the start of the discharge. Moreover, upon the discharge being extended by the gas flow, the discharge sustaining voltage V2 increases. Hence, it can be estimated that the higher the discharge sustaining voltage V2, the higher the gap flow speed vg. Conversely, it can be estimated that the lower the discharge sustaining voltage V2, the lower the gap flow speed vg. Therefore, when the discharge sustaining voltage V2 becomes lower than a predetermined voltage threshold Vth, it can be determined that the gap flow speed vg has become lower than the predetermined flow speed threshold vth (e.g., 5 m/sec).

In view of the above, in the present embodiment, the correlation between the discharge sustaining voltage V2 and the gap flow speed vg is determined in advance; and the discharge sustaining voltage V2 corresponding to the flow speed threshold vth for the gap flow speed vg is determined in advance as the voltage threshold Vth. Moreover, when the measured discharge sustaining voltage V2 becomes lower than the voltage threshold Vth, the first discharge is stopped. It should be noted that FIG. 8 illustrates an example of the waveform of the discharge sustaining voltage V2 when an active pause of the discharge is not performed.

In addition, the discharge sustaining voltage V2 may vary considerably when viewed in a minute time unit. Therefore, the discharge sustaining voltage V2 is determined as an average value of the discharge sustaining voltage for a most-recent predetermined minute time. The predetermined minute time may be, for example, 1° CA that denotes a length of time corresponding to 1° of the crank angle. Moreover, in FIG. 8, the crank angle of 0° represents the TDC; and the crank angle of −5° represents BTDC5®. The same applies to FIG. 10 that will be described later.

Furthermore, immediately after the start of the discharge, the discharge sustaining voltage V2 is relatively low because the discharge is in a state of having not been extended by the gas flow. That is, even if the discharge sustaining voltage V2 is lower than the voltage threshold Vth immediately after the start of the discharge, the gap flow speed vg is not always low. Therefore, the discharge pause is not performed for a predetermined period of time (e.g., 3° C.A) immediately after the start of the discharge.

Figure 9:
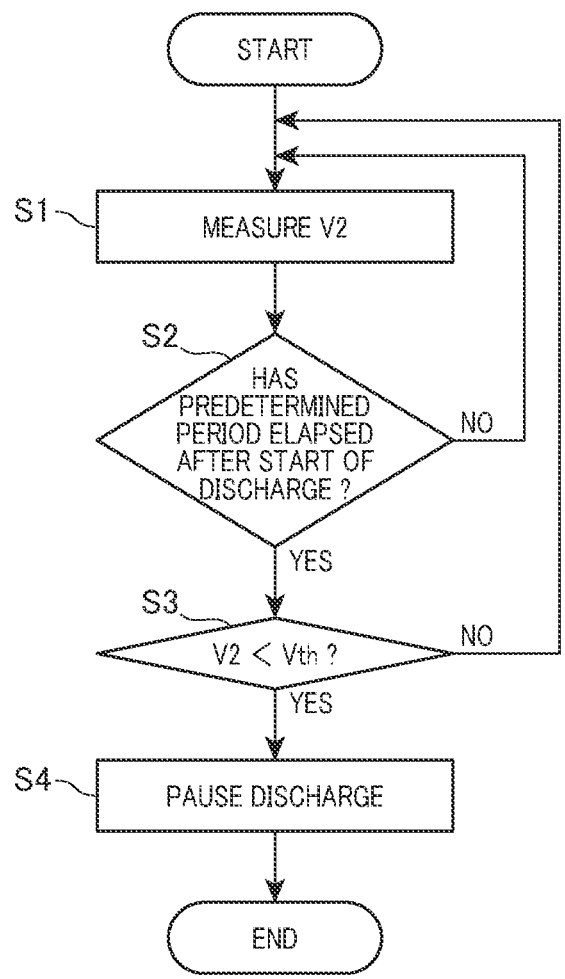
FIG. 9 is a flowchart illustrating a process of determining a discharge pause using the discharge sustaining voltage according to the third embodiment.

FIG. 9 is a flowchart illustrating a process of determining the start of the discharge pause period DP (i.e., determining the end of the first discharge) using the discharge sustaining voltage V2.

As shown in FIG. 9, in this process, first, in step S1, the discharge sustaining voltage V2 is successively measured.

Then, in step S2, it is determined whether a predetermined period of time (e.g., 3° C.A) has elapsed after the start of the discharge.

If the determination in step S2 results in a "NO" answer, the process returns to step S1. In contrast, if the determination in step S2 results in a "YES" answer, the process proceeds to step S3. That is, the process proceeds to step S3 only when the predetermined period of time has elapsed after the start of the discharge.

In step S3, it is further determined whether the discharge sustaining voltage V2 is lower than the voltage threshold Vth.

If the determination in step S3 results in a "NO" answer, the process returns to step S1. In contrast, if the determination in step S3 results in a "YES" answer, the process proceeds to step S4. That is, the process proceeds to step S4 in response to an event that the discharge sustaining voltage V2 becomes lower than the voltage threshold Vth.

In step S4, the discharge is paused. That is, the discharge pause period DP is started.

To realize the above process, the ignition apparatus 10 includes a voltage detection unit for measuring the discharge sustaining voltage V2. The voltage detection unit may be implemented by, for example, a voltage detection circuit that detects the voltage V1 generated by the primary coil of the ignition coil 7. Here, the voltage V1 generated by the primary coil of the ignition coil 7 is not the discharge sustaining voltage V2 itself. However, it is well known that the discharge sustaining voltage V2 can be easily calculated based on both the voltage V1 generated by the primary coil of the ignition coil 7 and the ratio of turns of the ignition coil 7.

Next, a method of determining the start of the discharge pause period DP using the attenuation rate of the discharge current will be described.

Figure 10:
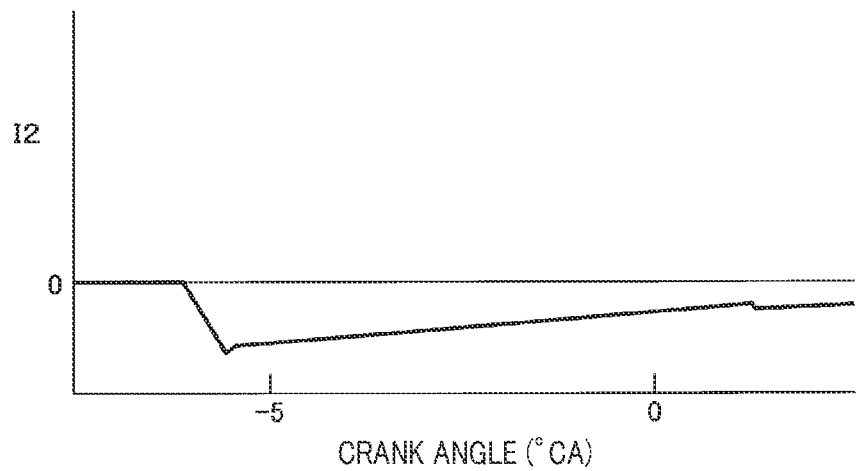
FIG. 10 is a timing chart illustrating discharge current in the ignition apparatus according to the third embodiment.

As shown in FIG. 10, the discharge current I2 is lowered for a short period of time immediately after the start of the discharge. However, the attenuation rate $4I2/\Delta t$ of the discharge current I2 is not constant, but varies depending on the discharge sustaining voltage V2. That is, the attenuation rate $\Delta I2/\Delta t$ of the discharge current I2 increases with increase in the discharge sustaining voltage V2 and decreases with decrease in the discharge sustaining voltage V2. Hence, it can be estimated that the higher the attenuation rate $4I2/\Delta t$ of the discharge current I2, the higher the gap flow speed vg. Conversely, it can be estimated that the lower the attenuation rate $\Delta I2/\Delta t$ of the discharge current I2, the lower the gap flow speed vg. Therefore, when the attenuation rate $\Delta I2/\Delta t$ of the discharge current I2 becomes lower than a predetermined attenuation threshold Fth, it can be determined that the gap flow speed vg has become lower than the predetermined flow speed threshold vth (e.g., 5 m/sec).

In view of the above, in the present embodiment, the correlation between the attenuation rate $\Delta I2/\Delta t$ of the discharge current I2 and the gap flow speed vg is determined in advance; and the attenuation rate $\Delta I2/\Delta t$ corresponding to the flow speed threshold vth for the gap flow speed vg is determined in advance as the attenuation threshold Fth. Moreover, when the measured attenuation rate $\Delta I2/\Delta t$ becomes lower than the attenuation threshold Fth, the first discharge is stopped. It should be noted that FIG. 10 illustrates an example of the waveform of the discharge current I2 when an active pause of the discharge is not performed.

In addition, the attenuation rate 4I2/Δt is determined as an average value of the attenuation rate for a most-recent predetermined minute time. The predetermined minute time may be, for example, 1° C.A. Moreover, the discharge pause is not performed for a predetermined period of time (e.g., 3° C.A) immediately after the start of the discharge.

Figure 11:
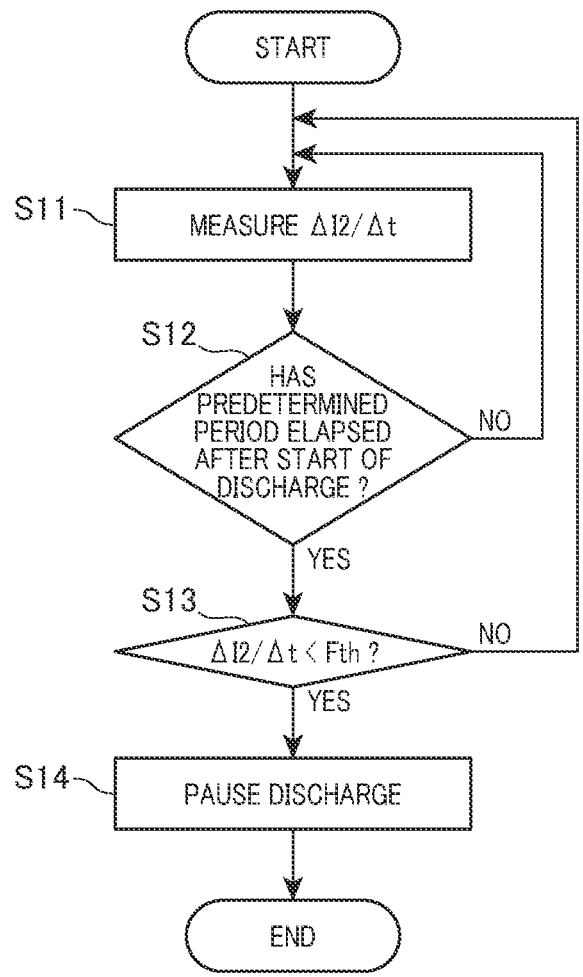
FIG. 11 is a flowchart illustrating a process of determining a discharge pause using the attenuation rate of the discharge current according to the third embodiment.

FIG. 11 is a flowchart illustrating a process of determining the start of the discharge pause period DP (i.e., determining the end of the first discharge) using the attenuation rate ΔI2/Δt of the discharge current I2.

As shown in FIG. 11, in this process, first, in step S11, the attenuation rate 4I2/Δt is successively measured.

Then, in step S12, it is determined whether a predetermined period of time (e.g., 3° C.A) has elapsed after the start of the discharge.

If the determination in step S12 results in a "NO" answer, the process returns to step S11. In contrast, if the determination in step S12 results in a "YES" answer, the process proceeds to step S13. That is, the process proceeds to step S13 only when the predetermined period of time has elapsed after the start of the discharge.

In step S13, it is further determined whether the attenuation rate ΔI2/Δt is lower than the attenuation threshold Fth.

If the determination in step S13 results in a "NO" answer, the process returns to step S11. In contrast, if the determination in step S13 results in a "YES" answer, the process proceeds to step S14. That is, the process proceeds to step S14 in response to an event that the attenuation rate ΔI2/Δt becomes lower than the attenuation threshold Fth.

In step S14, the discharge is paused. That is, the discharge pause period DP is started.

To realize the above process, the ignition apparatus 10 includes a current detection unit for measuring the discharge current I2. The current detection unit may be implemented by, for example, a current detection circuit that detects electric current flowing through the wiring between the secondary coil of the ignition coil 7 and the ground.

Moreover, in the present embodiment, the start time of the second discharge (i.e., the end time of the discharge pause period DP) may be set in various manners. For example, the second discharge may be started after a predetermined time has elapsed from the start of the discharge pause period DP. In addition, the predetermined time may be set in advance. The others are the same as those in the first embodiment.

According to the present embodiment, it is also possible to achieve the same advantageous effects as described in the first embodiment.

Moreover, in the present embodiment, the start time of the discharge pause period DP (i.e., the end time of the first discharge) is set based on the discharge sustaining voltage V2 or the attenuation rate ΔI2/Δt of the discharge current I2. Consequently, it becomes possible for the controller 8 to suitably control discharge in the spark plug 1 according to the actual operating state.

In addition, as an alternative to the above methods, both the discharge sustaining voltage V2 and the attenuation rate ΔI2/Δt of the discharge current I2 may be monitored; and the discharge may be paused (i.e., the discharge pause period DP may be started) when either or both of the following conditions become satisfied: (V2<Vth); and (ΔI2/Δt<Fth).

Fourth Embodiment

Figure 12:
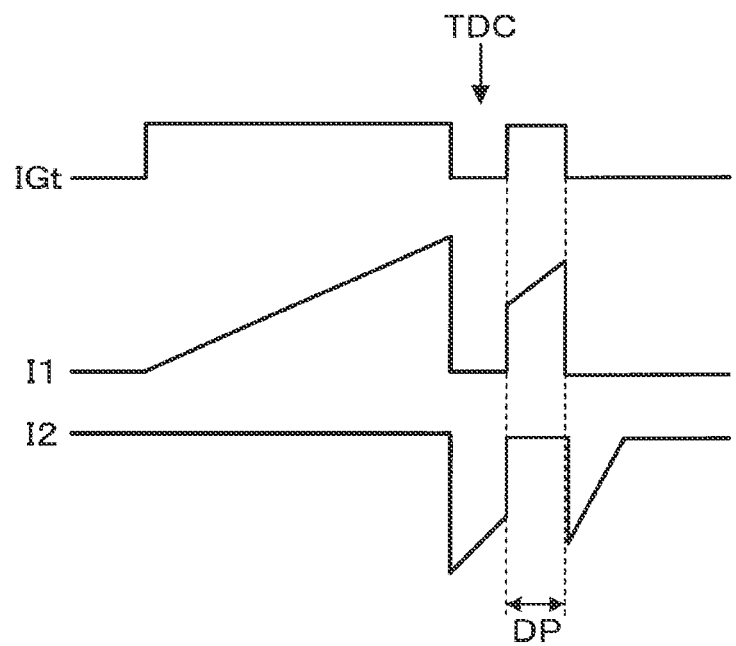
FIG. 12 is a timing chart illustrating an ignition signal, primary current and secondary current near a TDC in an ignition apparatus according to a fourth embodiment.

In the present embodiment, as shown in FIG. 12, the discharge pause period DP is set to a period after the TDC.

Figure 13:
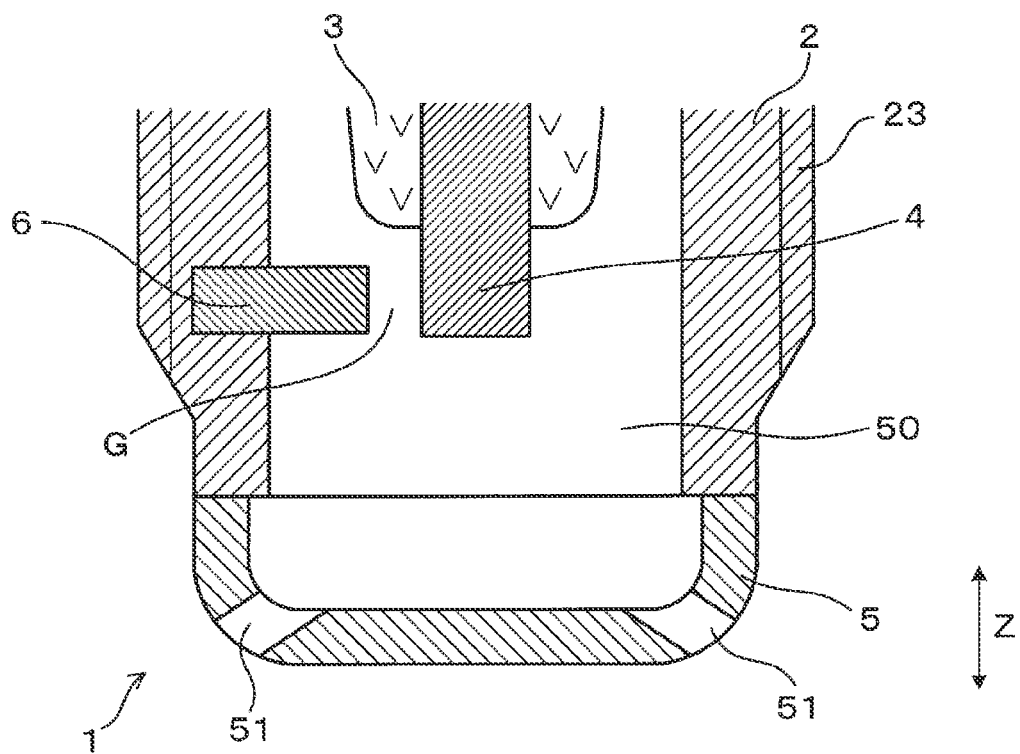
FIG. 13 is a cross-sectional view of a distal end part of a spark plug of the ignition apparatus according to the fourth embodiment.

Specifically, in the present embodiment, as shown in FIG. 13, the discharge gap G is arranged at a position relatively far from the orifices 51; therefore, the timing at which the gap flow speed vg is lowered is slightly retarded from the TDC as described above. Accordingly, in the present embodiment, as shown in FIG. 12, the discharge pause period DP is set to be in the expansion stroke.

Moreover, in the present embodiment, the first discharge is generated across the TDC. Specifically, the start time of the first discharge is set to be immediately before the TDC; and the end time of the first discharge is set to be immediately after the TDC. On the other hand, the second discharge is generated after the discharge pause period DP in the expansion stroke.

In addition, as an alternative, the start time of the first discharge may be set to be coincident with the TDC. As another alternative, the start time of the first discharge may be set to be in the expansion stroke. In either of the above alternative cases, the discharge pause period DP is provided in the expansion stroke. Moreover, the gap flow speed vg is higher during the discharge periods immediately before and immediately after the discharge pause period DP than during the discharge pause period DP. The others are the same as those in the first embodiment.

According to the present embodiment, it is also possible to achieve the same advantageous effects as described in the first embodiment.

In addition, as in the present embodiment, the discharge pause period DP may be provided in the expansion stroke, i.e., set to be after the TDC. Specifically, due to various factors such as the shape of the spark plug 1, the timing at which the gap flow speed vg is lowered may be slightly retarded from the TDC. Even in this case, by providing the discharge pause period DP according to the timing at which the gap flow speed vg is lowered, it is still possible to realize efficient combustion with the discharge generated before and after the discharge pause period DP.

While the above particular embodiments have been shown and described, it will be understood by those skilled in the art that various modifications, changes and improvements may be made without departing from the spirit of the present disclosure.

For example, in the above-described embodiments, explanation is given of the case where swirl flow is formed in the auxiliary combustion chamber 50. However, the present disclosure can also be applied to other cases where the gas flow in the auxiliary combustion chamber 50 is in other forms such as tumble flow.

In the above-described embodiments, explanation is given of the multiple-discharge mode in which discharge is generated twice in one cycle. Alternatively, in the multiple-discharge mode, discharge may be generated three or more times in one cycle.

What is claimed is:

1. An ignition apparatus for an internal combustion engine, the ignition apparatus comprising:
    a spark plug having an auxiliary combustion chamber in which a discharge gap is arranged;
    an ignition coil configured to apply a voltage to the spark plug; and
    a controller configured to perform a multiple-discharge mode in which discharge is generated at least twice, with a discharge pause period intervening therebetween, across the discharge gap within a period from a compression stroke to an expansion stroke of the internal combustion engine, wherein:
in the multiple-discharge mode, the controller causes the discharge to be generated at least once in the expansion stroke;
a gas flow speed in the discharge gap is lower during the discharge pause period than during discharge periods immediately before and immediately after the discharge pause period;
the discharge pause period is set to a low flow speed period during which the gas flow speed in the discharge gap is lower than a predetermined flow speed threshold; and
in the multiple-discharge mode, a first discharge is generated immediately before a compression top dead center (TDC), then the discharge pause period is provided between a time instant immediately before the TDC and a time instant immediately after the TDC, and then a second discharge is generated immediately after the TDC.

2. The ignition apparatus as set forth in claim 1, wherein the low flow speed period is after a compression top dead center.

3. The ignition apparatus as set forth in claim 1, wherein the controller has the discharge pause period stored therein as a specific period.

4. The ignition apparatus as set forth in claim 1, wherein the discharge pause period is set to start when a discharge sustaining voltage or an attenuation rate of discharge current of the discharge generated immediately before the discharge pause period becomes lower than a predetermined threshold.

5. The ignition apparatus as set forth in claim 1, wherein the spark plug includes a center electrode and a ground electrode; and
the discharge gap is formed between (i) the center electrode which protrudes in a radially outward direction of the spark plug and (ii) the ground electrode which protrudes in a radial direction of the spark plug towards the center electrode.

6. The ignition apparatus as set forth in claim 1, wherein the first discharge is generated in the compression stroke immediately before the compression top dead center (TDC) and during a period where the gas flow speed in the discharge gap is maintained, and the second discharge is generated in the expansion stroke and after the gap flow speed starts increasing.

7. An ignition apparatus for an internal combustion engine, the ignition apparatus comprising:
a spark plug having an auxiliary combustion chamber in which a discharge gap is arranged;
an ignition coil configured to apply a voltage to the spark plug; and
a controller configured to perform a multiple-discharge mode in which discharge is generated at least twice, with a discharge pause period intervening therebetween, across the discharge gap within a period from a compression stroke to an expansion stroke of the internal combustion engine,
wherein:
in the multiple-discharge mode, the controller causes the discharge to be generated at least once in the expansion stroke;
the discharge pause period is set to start when a discharge sustaining voltage or an attenuation rate of discharge current of the discharge generated immediately before the discharge pause period becomes lower than a predetermined threshold; and
in the multiple-discharge mode, a first discharge is generated immediately before a compression top dead center (TDC), then the discharge pause period is provided between a time instant immediately before the TDC and a time instant immediately after the TDC, and then a second discharge is generated immediately after the TDC.

8. The ignition apparatus as set forth in claim 7, wherein a gas flow speed in the discharge gap is lower during the discharge pause period than during discharge periods immediately before and immediately after the discharge pause period.

9. The ignition apparatus as set forth in claim 7, wherein the spark plug includes a center electrode and a ground electrode; and
the discharge gap is formed between (i) the center electrode which protrudes in a radially outward direction of the spark plug and (ii) the ground electrode which protrudes in a radial direction of the spark plug towards the center electrode.

\* \* \* \* \*